United States Patent
Oka

(10) Patent No.: US 6,786,656 B2
(45) Date of Patent: Sep. 7, 2004

(54) FILM MAGAZINE

(75) Inventor: Mitsuhiko Oka, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/668,223

(22) Filed: Sep. 24, 2003

(65) Prior Publication Data

US 2004/0081452 A1 Apr. 29, 2004

(30) Foreign Application Priority Data

Sep. 24, 2002 (JP) ........................................ 2002-276828

(51) Int. Cl.[7] .................................................. G03B 1/00
(52) U.S. Cl. ...................................... 396/414; 396/511
(58) Field of Search ................................. 396/414, 511

(56) References Cited

U.S. PATENT DOCUMENTS

| | | | | |
|---|---|---|---|---|
| 2,142,853 A | * | 1/1939 | Landrock | 396/440 |
| 3,421,424 A | * | 1/1969 | King et al. | 396/414 |
| 5,669,019 A | * | 9/1997 | Woltz et al. | 396/25 |

FOREIGN PATENT DOCUMENTS

| | | |
|---|---|---|
| JP | 11-119329 | 4/1999 |
| JP | 11-119330 | 4/1999 |
| JP | 11-305328 | 11/1999 |

* cited by examiner

*Primary Examiner*—David M. Gray
(74) *Attorney, Agent, or Firm*—Young & Thompson

(57) ABSTRACT

A roll film, which is wound up on a feeder spool with emulsion surface facing inward on the roll, is turned inside out and is drawn from the feeder spool to a first guide roller. The photo film is turned inside out again while being fed through a second guide roller and is wound up on a take-up spool with the emulsion surface facing inward on the roll. On an inner wall of a film magazine facing the second guide roller, a press roller presses the photo film to prevent loosening of the photo film in a film feeding path from the periphery of the second guide roller to the take-up spool.

14 Claims, 6 Drawing Sheets

FILM MAGAZINE

BACKGROUND OF THE INVENTION

1. Field of the Invention

The present invention relates to a film magazine used for loading a photo film, wound around a spool in advance, with a camera.

2. Background Arts

A roll film of brownie size (brownie film) is not contained in a cartridge, so the roll film in the market is wound up on a feeder spool in a roll form using a light-shielding paper. The feeder spool, on which an unexposed film is wound up, is loaded in the film-loading chamber of the camera. Then, an empty spool (take-up spool) for taking up the roll film is loaded in a film take-up chamber of the camera.

An exposure to a picture frame is taken after drawing the unexposed film by a predetermined amount from the feeder spool. The exposed picture frame is wound up on a take-up spool. The whole film is wound up on the take-up spool after completion of the exposure. Then, the take-up spool is taken out of the film take-up chamber and brought into a photo lab. Thereby, the feeder spool in the film-loading chamber becomes empty, since the whole film wound up on the feeder spool is drawn out after completion of the exposure. The empty feeder spool is taken out of the film-loading chamber at the next exposure, and is loaded in the film take-up chamber to be used as the take-up spool.

The brownie film has 120 type and 220 type with same width. The 120 type Brownie film is made of the film, the light-shielding paper longer than the film, and a splice tape. The light-shielding paper is adhered to the film by putting the splice tape on leading and trailing ends of the film such that the leading and the trailing end portions of the light-shielding paper extend off the leading and the trailing ends of the film respectively.

In the 220 type Brownie film, the light-shielding papers are adhered to the leading and the trailing end portions of the film by the splice tape. Since the light-shielding paper covers only the leading and the trailing end portions, the 220 type Brownie film becomes thinner than the 120 type Brownie film because of the thickness of the light-shielding paper.

It is difficult to load the Brownie film into the camera due to a long film width. For that reason, a film holder, attachable to the main body of the camera, is well known. (For example, Japanese Patent Laid-Open Publication No. 11-305328.)

The film holder retains the feeder spool and the take-up spool in a rotatable manner, and has a pressure plate between those spools. The front face of the pressure plate is exposed through an opening provided in the film holder. The opening is covered by a mask plate when the film holder is removed from the main body of the camera. A pair of guide rollers is provided on both sides of the pressure plate in the film feeding direction in order to form a film exposure station for exposing the film in front of the pressure plate. The film is drawn from the feeder spool and is threaded onto the take-up spool through a film feeding path connecting a first guide roller (which is closer to the feeder spool), the front face of the pressure plate, and a second guide roller (which is closer to the take-up spool).

The film, which is wound up on the feeder spool with the emulsion surface facing inward on the roll, is advanced to the first guide roller while turning the emulsion surface outward to form an "S" shape.

When advancing the roll film from the first guide roller to the take-up spool, the roll film with the emulsion surface facing outward is turned in "S" shape so that the roll film is wound up on the take-up spool with the emulsion surface facing inward on the roll again. Thus, the roll film is being fed such that the emulsion surface of the roll film is turned inside out. (For example, Japanese Patent Laid-Open Publication No. 11-119330.) This form of film feeding has an advantage of reducing the width of the film holder. Further, this form of film feeding can be applied not only to the 120 type Brownie film, but also to the film of 220 type Brownie film with no light-shielding paper behind the film.

Notwithstanding high rigidity, the film is curled since it has been wound about the feeder spool for a long period. In addition, 120 type Brownie film with the light-shielding paper behind the film is more rigid than that of the 220 type Brownie film. Therefore, when the film is wound up on the take-up spool, the film, particularly the 120 type Brownie film may get loosened to cause a rise from the second guide roller or a curl in the film width direction perpendicular to the film feeding direction. As a result, the behavior of the film feeding becomes unstable.

Some cameras have a bar code sensor or a data recording device to reads or records data while feeding the film. The bar code sensor or the data recording device is located at a position to face the second guide roller. If the film gets loosened, the distance and the relative speed between the film and the second guide roller become unstable. In that case, data reading or recording process becomes improper.

To solve that problem, it is known to provide a subsidiary guide roller in a position between the take-up spool and the second guide roller. The film is loosened only in the area between the take-up spool and the subsidiary roller, so that the film is parallel to the focused plane of a lens system of the data recording mechanism. (For example, Japanese Patent Laid-Open Publication No. 11-119330.)

It is also known to provide a rib on an inner wall of the camera facing the first guide roller for preventing the looseness of the film. In that case, the film is nipped between a head of the rib and the first guide roller to prevent loosening so as to facilitate proper scanning (Japanese Patent Laid-Open Publication No. 11-119329).

However, in the invention of the Japanese Patent Laid-Open Publication No. 11-119330, additional space inside the film magazine is necessary for disposing the subsidiary guide roller in the proximity of the second guide roller. As a result, the film magazine is upsized. In the invention of Japanese Patent Laid-Open Publication No. 11-119329, there is a problem that the roll film is scratched by the rib which is disposed to contact the surface of the film.

SUMMARY OF THE INVENTION

An object of the present invention is to provide a compact film magazine which prevents a roll film from loosening.

Another object of the present invention is to provide a film magazine which prevents scratches on the roll film while preventing the roll film from loosening.

To achieve the above objects, the film magazine of the present invention provides a first guide roller which turns emulsion surface of the roll film outward and feeds the roll film from a feeder spool to a film support plate, a second guide roller which turns the emulsion surface of the roll film inward and feeds the roll film from the film support plate to the take-up spool, and a roller which is on the opposite side of said first or second guide roller with respect to a film feeding path. When the roll film gets loosened to becomes away from the film feeding path while being fed from the feeder spool to the first guide roller or from the second guide roller to the take-up spool, the roller contacts the roll film to prevent loosening. In addition, a rib is provided in a widthwise direction of the roll film along with the roller. When the roll film gets loosened to become away from the film feeding path, rib contacts the end portion of the roll film in the width direction to prevent loosening.

The film magazine includes a film holder for retaining the roll film and the magazine body for covering the film holder. It is preferable that the roller is attached to the magazine body to protrude into the film feeding path.

According to the present invention, it is possible to provide the compact film magazine in which the roller and the rib can regulate loosening of the roll film while feeding. Accordingly, it becomes possible to prevent improper feeding and/or the scratches on the roll film.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
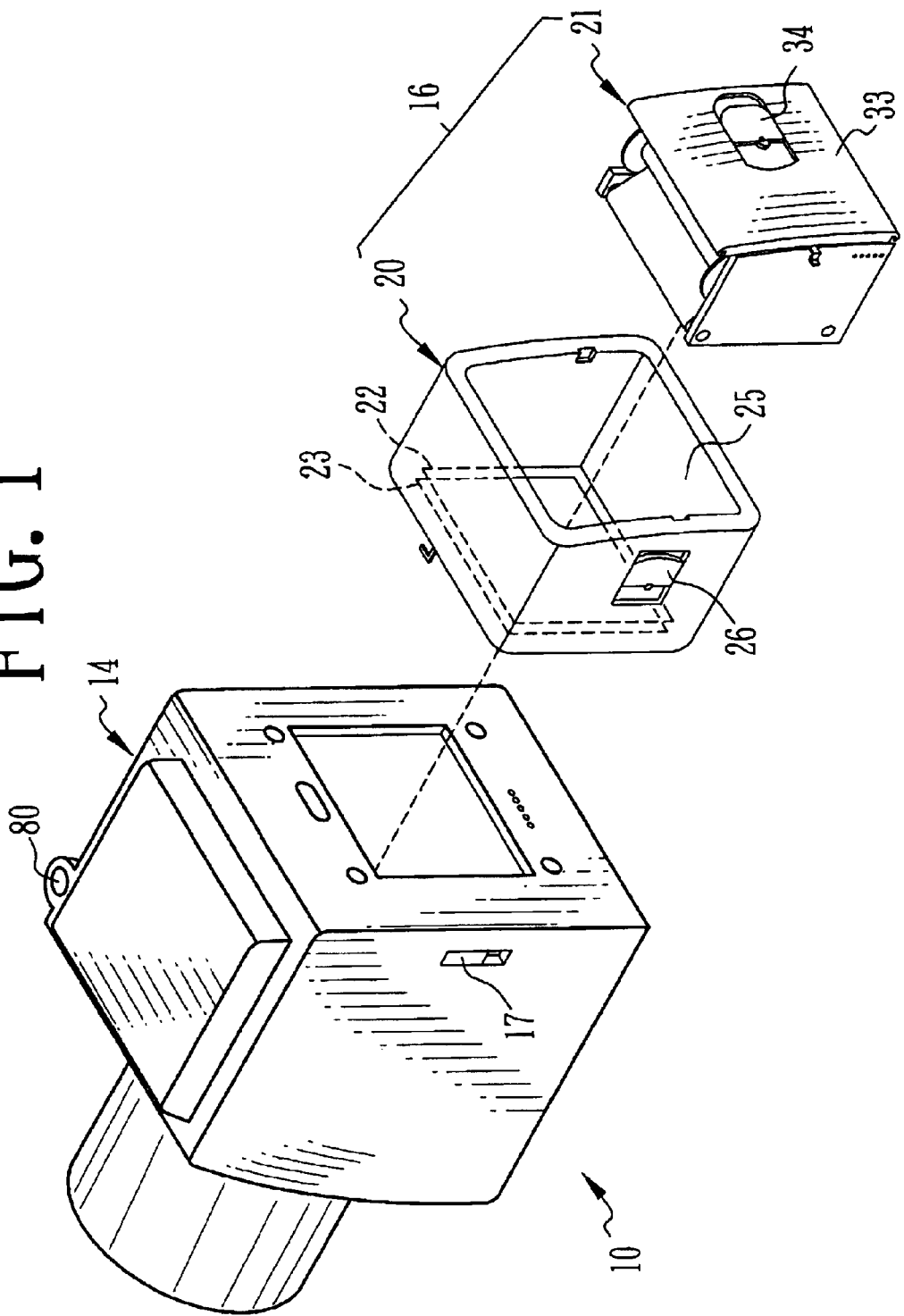
FIG. 1 is a perspective view of substantial parts of a camera according to the present invention viewed from a rear lid.
Figure 2:
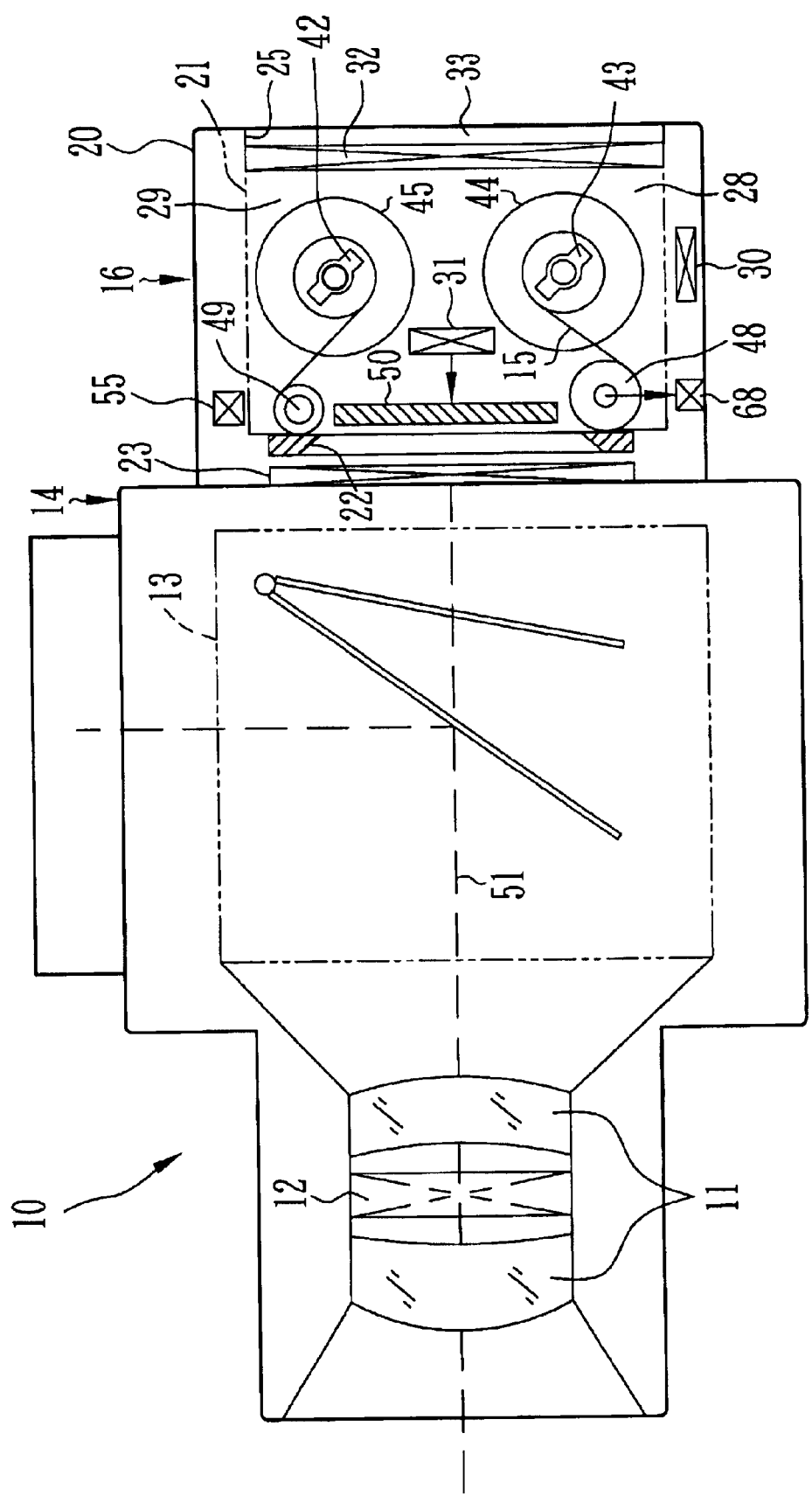
FIG. 2 is an explanatory view of the inner structure of the camera.

Referring to FIG. 1 and FIG. 2, a camera 10 is constituted of a main body 14 and a film magazine 16 that is attachable to the main body 14. The main body 14 contains a taking lens 11, a lens shutter 12, and a mirror/mask plate moving mechanism 13. The film magazine 16 is detached from the main body 14, when loading a photo film 15. The film magazine 16 is detached by sliding a slide lever 17 provided in the main body 14 of the camera.

The film magazine 16 is constituted of the magazine body 20 and a film holder 21. In the magazine body 20, an aperture 22, a light-shielding mask 23, and a holder insertion opening 25 are provided. The aperture 22 is formed in the front surface that connects the film magazine 16 to the main body 14. The light-shielding mask 23 for opening and shutting the aperture 22, and the aperture 22 is movable by the operation of a knob 26 provided on the outer surface of the magazine body 20. The holder insertion opening 25 is formed in the side opposite to the aperture 22.

The film holder 21 has a film loading section 28, a film take-up section 29, a film feeding mechanism 30, a pressure-plate switch mechanism 31, a lock mechanism 32, and a rear lid 33. The lock mechanism 32 locks the film holder 21 in the magazine body 20. The rear lid 33 covers the holder insertion opening 25. An operation panel 34 in the rear lid 33 is exposed outside. The film holder 21 is taken out of the magazine body 20 by operating the operation panel 34.

Figure 3:
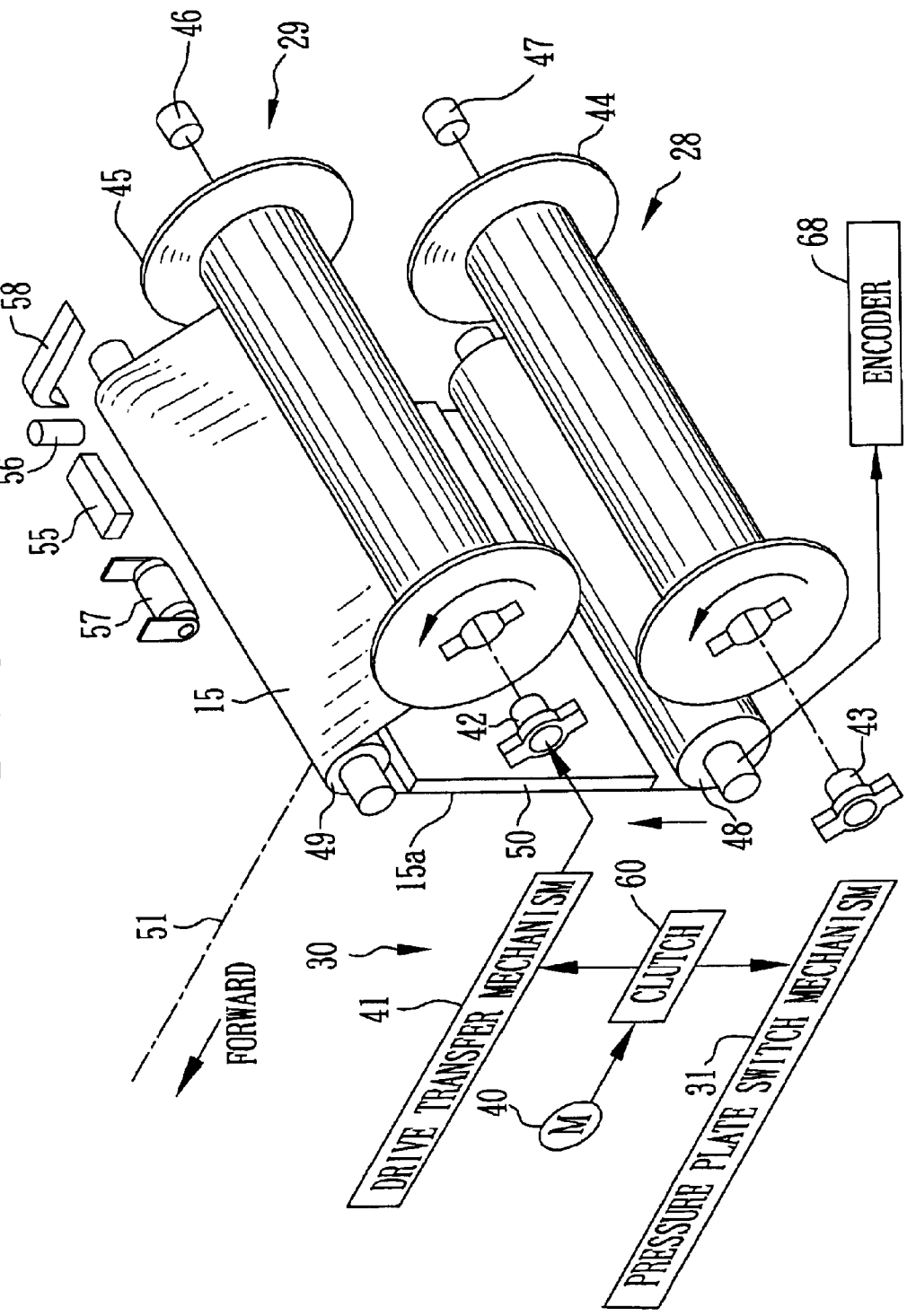
FIG. 3 is a perspective view of a film feeding mechanism incorporated in a film magazine.

Referring to FIG. 3, the film feeding mechanism 30 is constituted of a feeding motor 40, a drive transfer mechanism 41, a drive shaft 42, and a driven shaft 43. A feeder spool 44, on which the Brownie type photo film 15 is wound up, is loaded in the film loading section 28. An empty take-up spool 45 is loaded in a film take-up section 29.

The drive shaft 42 is provided in the film take-up section 29, and the drive shaft 42 is engaged in a key-slot provided in one end of the take-up spool 45 in the axial direction thereof. The take-up spool 45 is loaded in the film take-up section 29. A rotatable receiving shaft 46 is engaged in a key-slot provided in the other end of the take-up spool 45 in the axial direction. The rotation of the feeding motor 40 is transferred to the drive shaft 42. When the feeding motor 40 rotates forward, the take-up spool 45 rotates in the film take-up direction (counterclockwise in FIG. 3) together with the drive shaft 42.

The driven shaft 43 is engaged in a key-slot provided in an end of the feeding spool 44 in the axial direction thereof. The feeding spool 44 is loaded in the film loading section 28. The rotatable receiving shaft 47 is engaged in the other key-slot of the feeding spool 44.

The photo film 15 drawn from the film loading section 28 is fed to the film take-up section 29 through a first guide roller 48 (the film loading section 28 side) and a second guide roller 49 (the film take-up section 29 side). The guide rollers 48 and 49 are free rollers. A support plate 50, disposed between the guide rollers 48 and 49 supports an exposure frame 15a of the photo film 15, which is placed between the guide rollers 48 and 49, from behind with respect to the direction of a photographic axis 51. Although, the photo film 15 is fed vertically, it is possible to feed the film horizontally. An encoder 68 detects the angle of rotation of the first guide roller 48 to detect the feeding amount of the photo film 15.

A bar code sensor 55, a data recording device 56, a press roller 57, and a rib 58, provided in the magazine body 20, are located above the second guide roller 49. The bar code sensor 55 reads a bar code recorded on the splice tape to connect the photo film 15 with a light-shielding paper. The bar code includes film type data, film sensitivity data, exposure film number data, and so forth. The splice tape is adhered to the overlaid portion of the light-shielding paper (leader paper) and the front end of the photo film 15. The bar code sensor 55 is a photo sensor. The bar code sensor 55 radiates infrared light to the photo film 15, receives reflected infrared light, and outputs a photoelectric signal at a signal level according to the intensity of received reflected light.

The data recording device 56 is constituted of a lens, a prism, a mask, and an LED. The data recording device 56 optically records photographic information in an area outside the exposure frame while the film is being fed. Photographic information on the film surface is in a form of 7-segment letters, for example. It is possible to record photographic data magnetically.

When the feeding motor 40 rotates backward, the rotation is transferred to the support plate switch mechanism 31 by a clutch 60 which changes transmission of the rotation of the feeding motor 40. The support plate switch mechanism 31 moves the support plate 50 in the direction of the photographic light axis 51 (light axis direction) to change the width of a film feeding path according to the film type. The film feeding path is provided between a film receiving surface of the magazine body 20 and the front surface of the support plate 50.

When the 120 type Brownie film is used, the support plate 50 moves to a wide position for widening the film path. When the 220 type Brownie film is used, the support plate 50 moves to a narrow position for narrowing the film path.

When the bar code sensor 55 detects the bar code on the splice tape, a counter (not shown) starts to count the number of carrier pulse from the encoder 68, which corresponds to the rotational amount of the first guide roller 48. The feeding motor 40 stops the forward rotation when the counted number reaches a predetermined value indicating that the first exposure frame has reached in front of the pressure plate 50. Then, the feeding motor 40 rotates backward to move the support plate 50 on the basis of film type data that is obtained by the bar code sensor 55. After exposure, the photo film 15 is advanced by one frame based on the counted number of the carrier pulse.

Figure 4:
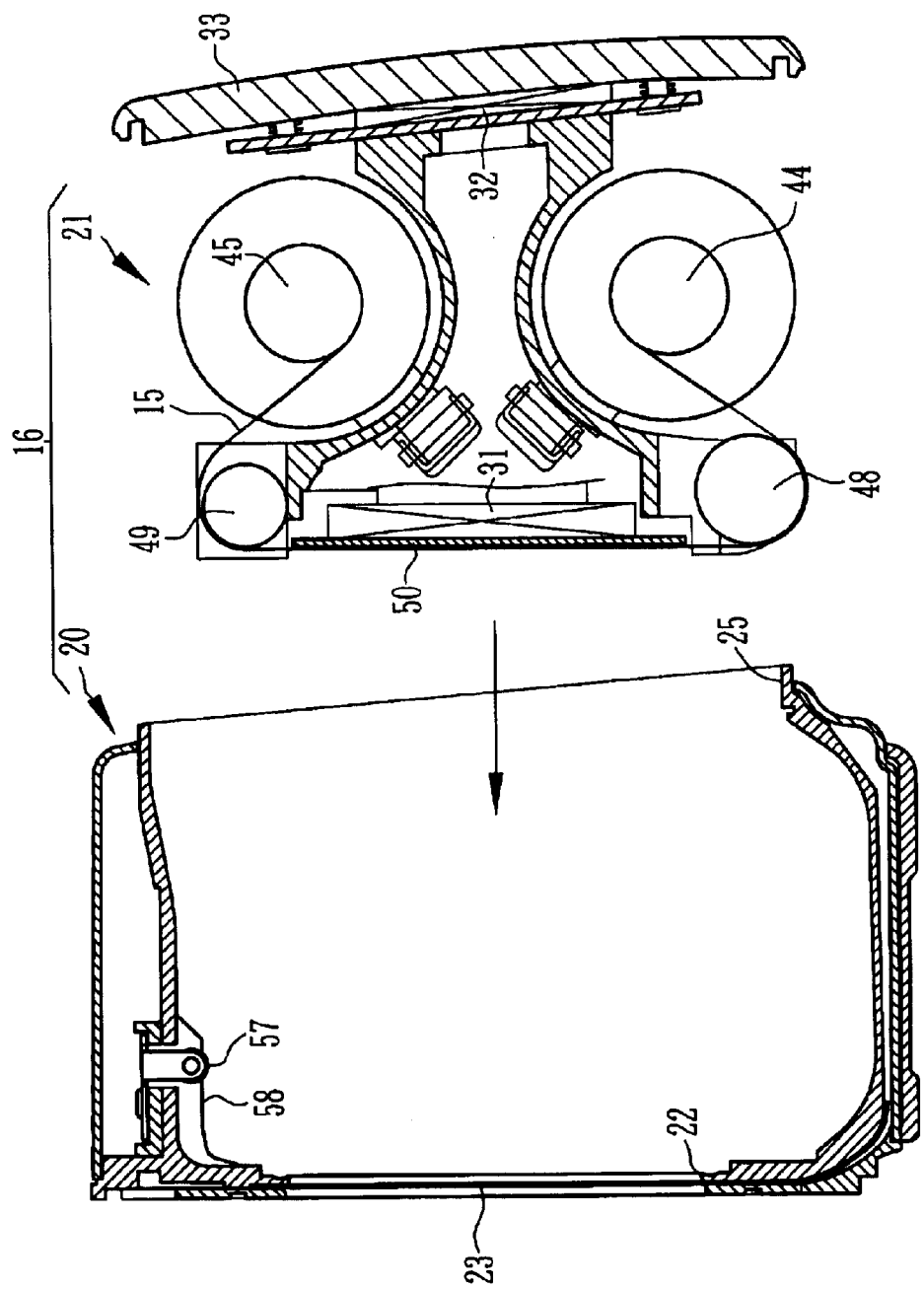
FIG. 4 is a longitudinal section illustrating a main body of the magazine and a film holder that are separated.
Figure 5:
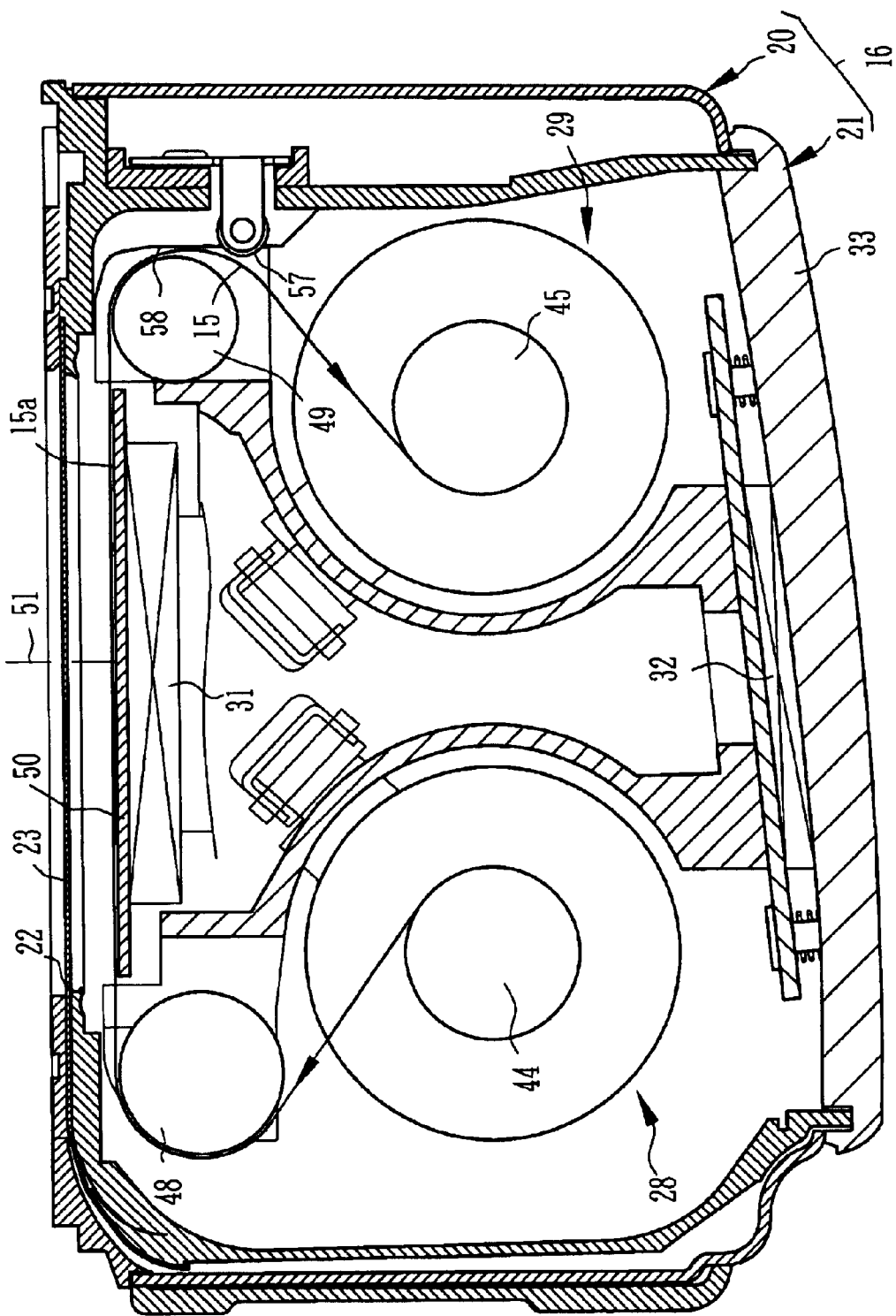
FIG. 5 is a longitudinal section illustrating the film holder attached to the main body of the magazine.
Figure 6:
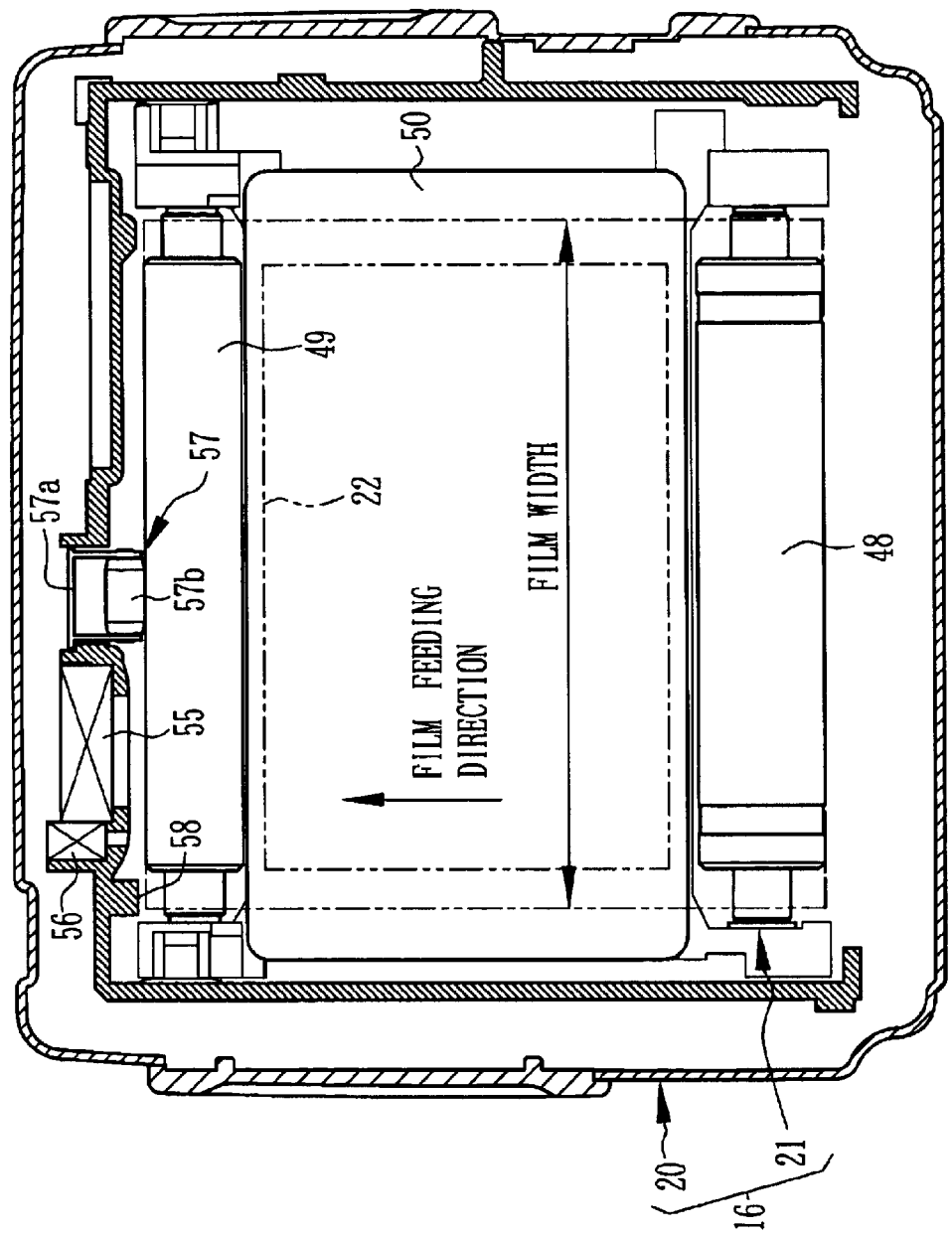
FIG. 6 is a cross-sectional view from an aperture side illustrating the film holder attached to the main body of the magazine.

Referring to FIGS. 4–6, the press roller 57 is provided to protrude to the film feeding path between the second guide roller 49 and the take-up spool 45. The press roller 57 is constituted of a plate 57a and a roller member 57b. The cross-section of the plate 57a forms a "U" shape. The roller member 57b is rotatably supported by both ends of the plate 57a in a manner that the rotation axis becomes parallel to that of the second guide roller 49.

When the film holder 21 is attached to the magazine body 20, the roller member 57b is retained in a position opposing the center of the second guide roller 49. (See FIG. 5.) Between the second guide roller 49 and the roller member 57b, there is a gap larger than the thickness of the photo film 15, so that the photo film 15 is smoothly fed toward the take-up spool 45. Rotation center of the roller member 57b is closer to the take-up spool 45 compared to the rotational center of the second guide roller 49 with respect to the light axis direction. The photo film 15 comes in contact with the roller member 57b when the photo film 15 is loosened due to rigidity while being fed from the second guide roller 49 to the take-up spool 45. The roller member 57b guides the photo film 15 to the take-up spool 45. The length of the roller member 57b is provided such that the roller member 57b can press a part of the loosened portion of the photo film 15. However, it is also possible to make the length of the roller member 57b the same size as the width of the photo film 15. The roller member 57 does not affect the operations of the data recording device 56 and the bar code sensor 55, since the roller member 57 is disposed outside the focused area of the data recording device 56 or the scanning area of the bar code sensor 55.

The rib 58 has a curved surface that covers a part of periphery of the second guide roller 49. The end of the rib 58 protrudes to the inside of the magazine body 20. When the film holder 21 is attached to the magazine body 20, the rib 58 is opposed to the end portion of the second guide roller 49 in the axial direction. The rib 58 does not block the feeding of the photo film 15, since gap between the second guide roller 49 and the rib 50 is larger than the thickness of the photo film 15. When the photo film 15 becomes loosened toward the magazine body 20 while being fed to the take-up spool 45 by the second guide roller 49, the rib 58 comes in contact with the end portion of the photo film 15 to prevent loosening of the photo film 15.

Next, the operation of the above configuration is explained. Before loading the photo film 15 into a camera 10, the knob 26 is operated. Then, the mask plate 23 moves to the position to cover the aperture 22.

After covering the aperture 22, the film holder 21 is taken out of the magazine body 20 by operating the operation panel 34 to release the lock of the lock mechanism 32. Then, the feeder spool 44, on which the photo film 15 of 120 type is wound up in advance, is loaded in the film loading section 28 of the film holder 21. The empty take-up spool 45 is loaded in the film take-up section 29.

Thereafter, the front end of the leader paper is advanced to the first guide roller 48, the front surface of the support plate 50, and the second guide roller 49 sequentially, and then the front end of the leader paper is inserted into the slot of the take-up spool 45 of the film take-up section 29. Thereby the photo film 15 is advanced while reversing the emulsion surface of the photo film 15. The take-up spool 45 makes a couple of rotations to wind the leader paper on the take-up spool 45. Thus, the loading of the photo film 15 is completed.

The film holder 21 loaded with the photo film 15 is attached to the magazine body 20 as illustrated in FIG. 4. The film holder 21 is attached accurately to the inside of the magazine body 20 by using positioning means formed of projections and depressions (not shown). The film magazine 16 is attached to the main body 14 of the camera. Thereafter, the knob 26 is operated to open the aperture 22.

After attaching the film magazine 16 to the main body 14 of the camera, the feeding motor 40 is driven to rotate backwards to actuate the pressure plate switch mechanism 31. After the pressure plate moves to the wide position, an initial film feeding operation is carried out.

In the initial film feeding operation, the feeding motor 40 rotates forward to feed the photo film 15 until the first exposure frame is set in the aperture 22. The rotation of the feeding motor 40 is transferred to the drive shaft 42 through the film feeding mechanism 30. The drive shaft 42 rotates the take-up spool 45 in the film take-up direction and draws the photo film 15 from the feeder spool 44.

During the initial film feeding operation, the bar code sensor 55 reads the bar code printed on the splice tape. The camera 10 detects information regarding the film type, the film sensitivity, and the number of the exposure frames according to the signal from the bar code sensor 55. When the bar code is detected, the encoder 68 is actuated to detect the rotation angle of the first guide roller 48. The feeding amount of the photo film 15 is detected according to the carrier pulse from the encoder 68. The initial film feeding operation is completed when the first exposure frame is set in the aperture 22.

While the photo film 15 is fed to the take-up spool 45, the photo film 15 may loosen toward the magazine body 20 in the periphery of the second guide roller 49. When the looseness of the photo film 15 becomes large, the press roller 57 and the rib 58 press the photo film 15 to prevent further loosening. Accordingly, improper film feeding and scratches on the photo film 15 can be prevented. In this embodiment, the bar code sensor 55 is positioned between the rib 58 and the press roller 57 in the width direction of the photo film 15, so the rib 58 and the press roller 57 ensure accurate reading of the bar code by the bar code sensor 55. The rib 58 does not make scratches on the exposure frames of the photo film 15, since the rib 58 is disposed to contact the end portion of the photo film 15 in the width direction.

After the initial film feeding operation, the film type is distinguished according to film type information read by the bar code sensor 55. When the photo film 15 is 120 type, it is not necessary to change the position of the support plate 50 since it has been set in the wide position.

On the other hand, when the photo film 15 is 220 type, the support plate 50 is moved to the narrow position by rotating the feeding motor 40 backward to actuate the support plate switch mechanism 31. In this way, the photo film 15 is fed by the rotation of the feeding motor 40 in one direction, while the width of the film feeding path is changed by the rotation of the feeding motor 40 in the other direction. When the first exposure frame is set in the aperture and the width of the film feeding path is changed according to the type, the camera becomes ready for exposure.

When a release button 80 (see FIG. 1) provided outside the main body 14 of the camera is operated, the lens shutter 12 (see FIG. 2) is closed in response. At the same time, the mirror of the mirror/mask plate moving mechanism 13 is lifted. In response to closing the lens shutter 12, the mask plate of the mirror/mask plate moving mechanism 13 is lifted. Thereafter, the lens shutter 12 is actuated for predetermined time to take an exposure in response to lifting the mirror and the mask plate.

When the exposure is completed, the signal for taking up the film is sent to the driver of the feeding motor 40 in response to the exposure completion signal sent from the lens shutter 12. Thereby, the feeding motor 40 rotates forward to advance the photo film 15 by one frame. At the same time, a down signal is sent to the mirror/mask plate moving mechanism 13 to put the mirror and the mask plate down in the initial positions. In this way, the camera is ready for the next exposure.

While advancing the photo film 15 by one frame, previous exposure information is recorded in the area outside the exposure frame by the data recording device 56. Thereafter, the exposures are carried out until the last exposure frame by repeating the film winding and the shutter release.

During the film advance, the photo film 15 may loosen toward the direction of the magazine body 20 in the periphery of the second guide roller 49. The loosened portion of the photo film 15 is pressed by the press roller 57 and the rib 58 to prevent further loosening. Accordingly, it is possible to feed the photo film 15 stably. In this embodiment, the data recording device 56 records exposure information in the end portion of the photo film 15. For that reason, the rib 58 and the data recording device 56 are positioned in the same side with respect to the width direction. Moreover, the data recording device 56 is between the rib 58 and the press roller 57 in the width direction. Therefore, the exposure information can be recorded clearly by improving flatness of the photo film 15 in the recording position.

After exposing the last exposure frame, the take-up spool 45 is rotated to wind the entire photo film 15. When the bar code sensor 55 detects the trailer paper, the feeding motor continues the forward rotation to wind the trailer paper around the take-up spool. When the bar code sensor 55 detects the end of the trailer paper, the feeding motor 40 stops the rotation. Thereby, the whole photo film 15 is wound up on the take-up spool 45.

When the exposed photo film 15 is completely wound up on the take-up spool 45, the new photo film 15 is loaded. In order to load the new photo film 15, the film holder 21 is removed and the take-up spool 45, on which the exposed photo film 15 has been wound up, is taken out of the film take-up section 29. Next, the empty feeder spool 44 is taken out of the film loading section 28 and loaded in the film take-up section 29 to be used as the take-up spool 45. Then, the feeder spool 44, on which the new photo film 15 is wound up in advance, is loaded in the film loading section 28. Thereafter, the film holder 21 is attached to the magazine body 20. Thus, the camera becomes ready for the exposure again.

In the above embodiment, the roller member 57b and the rib 58 are used for preventing the photo film 15 from loosening. However, it is possible to carry out the above embodiment without using the rib 58.

In the above embodiment, the periphery of the roller member 57b is linear in the axial direction. However, it does not necessarily require the linear shape. It is also possible to form the periphery of the roller member 57b in an approximate conical shape, or with a curved surface so as to fit the curved surface of the photo film 15. In order to prevent the photo film 15 from being into contact with the photo film 15 while attaching and removing the film holder 21, it is preferable to provide a mechanism to move the press roller 57 between a retracted position not to contact the photo film 15 and a set position to contact the photo film 15 when attaching and removing the film holder 21.

In the above embodiment, the bar code sensor 55 is provided close to the take-up spool 45. However, it is possible to provide the bar code sensor 55 close to the feeder spool 44. In that case, it is also possible to prevent the photo film 15 from loosening toward the magazine body 20 by providing the roller member close to the feeder spool 44 to press the photo film 15 as that in the above embodiment.

In the above embodiment, the press roller and the rib are used for preventing the photo film 15 from loosening. However, it is also possible to use other members to prevent loosening of the photo film 15.

Although the present invention has been described with respect to the preferred embodiment, the present invention is not to be limited to the above embodiment, but, on the contrary, various modifications will be possible to those skilled in the art without departing from the scope of claims appended hereto.

What is claimed is:

1. A film magazine for feeding a roll film with an emulsion surface along a film feeding path from a feeder spool to a take-up spool via a film support plate, said film magazine comprising:

a first guide roller disposed between said feeder spool and said film support plate, said first guide roller turns said emulsion surface outward and feeds said roll film to said film support plate;

a second guide roller disposed between said film support plate and said take-up spool, said second guide roller turns said emulsion surface inward and feeds said roll film to said take-up spool; and a roller disposed on the opposite side of said first guide roller or said second guide roller with respect to said film feeding path, said roller being positioned to come into contact with said roll film at one of a point along the film feeding path between the second guide roller and the take-up spool, and a point along the film feeding path between the first guide roller and the feeder spool to regulate loosening of said roll film when said roll film is loosened and away from said film feeding path.

2. A film magazine as defined in claim 1, wherein said film magazine comprises a film holder for retaining said roll film and a magazine body for covering said film holder, said roller is attached to said magazine body to protrude into said film feeding path.

3. A film magazine as defined in claim 1, wherein said roller is positioned so that it comes into contact with said roll film at a point along the film feeding path between said second guide roller and said take-up spool.

4. A film magazine as defined in claim 1, wherein said roller is positioned so that it comes into contact with said roll film at a point along the film feeding path between said feeder spool and said first guide roller.

5. A film magazine as defined in claim 1, further comprising:
   a rib positioned to come into contact with only a margin of said roll film outside of an exposure area in a widthwise direction of said roll film when said roll film is loosened and is being away from said film feeding path.

6. A film magazine as defined in claim 5, wherein said rib and said roller are arranged along said widthwise direction.

7. A film magazine for feeding a roll film with a first emulsion surface and second opposite surface along a film feeding path from a feeder spool to a take-up spool via a film support plate, said film magazine comprising:
   a first guide roller disposed between said feeder spool and said film support plate, said first guide roller making contact with the second surface of the roll film, the roll film being wound around the feeder spool so that the first side faces inward;
   a second guide roller disposed between said film support plate and said take-up spool, said second guide roller making contact with the second surface of the roll film, the roll film being wound around the take-up spool so that the first side faces inward; and
   a roller disposed to make contact with the first side of the roll film as the roll film moves from the second guide roller to the take-up spool;
   wherein the roller is positioned so that the roller does not make contact with the roll film if the roll film passes tightly around the second guide roller and the take-up spool, the roller making contact with the roll film only if there is slack in the roll film between the second guide roller and the take-up spool.

8. A film magazine as defined in claim 7, wherein said film magazine comprises a film holder for retaining said roll film and a magazine body for covering said film holder, said roller being attached to said magazine body to protrude into said film feeding path.

9. A film magazine as defined in claim 7, further comprising:
   a rib positioned to come into contact with only a margin of said roll film outside of an exposure area in a widthwise direction of said roll film when there is slack in said roll film between the second guide roller and the take-up spool.

10. A film magazine as defined in claim 9, wherein said rib and said roller are arranged along said widthwise direction.

11. A film magazine for feeding a roll film with a first emulsion surface and second opposite surface along a film feeding path from a feeder spool to a take-up spool via a film support plate, said film magazine comprising:
   a first guide roller disposed between said feeder spool and said film support plate, said first guide roller making contact with the second surface of the roll film, the roll film being wound around the feeder spool so that the first side faces inward;
   a second guide roller disposed between said film support plate and said take-up spool, said second guide roller making contact with the second surface of the roll film, the roll film being wound around the take-up spool so that the first side faces inward; and
   a roller disposed to make contact with the first side of the roll film as the roll film moves from the feeder spool to the first guide roller;
   wherein the roller is positioned so that the roller does not make contact with the roll film if the roll film passes tightly around the first guide roller and the feeder spool, the roller making contact with the roll film only if there is slack in the roll film between the first guide roller and the feeder spool.

12. A film magazine as defined in claim 11, wherein said film magazine comprises a film holder for retaining said roll film and a magazine body for covering said film holder, said roller being attached to said magazine body to protrude into said film feeding path.

13. A film magazine as defined in claim 11, further comprising:
   a rib positioned to come into contact with only a margin of said roll film outside of an exposure area in a widthwise direction of said roll film when there is slack in said roll film between the first guide roller and the feeder spool.

14. A film magazine as defined in claim 13, wherein said rib and said roller are arranged along said widthwise direction.

* * * * *